(12) United States Patent
Kalbarga

(10) Patent No.: US 8,359,384 B2
(45) Date of Patent: *Jan. 22, 2013

(54) METHOD, SYSTEM, AND APPARATUS FOR COMMUNICATING WITH A COMPUTER MANAGEMENT DEVICE

(75) Inventor: Subash Kalbarga, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/889,933

(22) Filed: Sep. 24, 2010

(65) Prior Publication Data

US 2011/0015918 A1    Jan. 20, 2011

Related U.S. Application Data

(63) Continuation of application No. 10/790,160, filed on Mar. 1, 2004, now Pat. No. 7,827,258.

(51) Int. Cl.
*G06F 15/173* (2006.01)
*G06F 9/455* (2006.01)
*G06F 13/00* (2006.01)

(52) U.S. Cl. .............................. 709/223; 703/23; 710/34
(58) Field of Classification Search .................. None
See application file for complete search history.

(56) References Cited

U.S. PATENT DOCUMENTS

| | | | |
|---|---|---|---|
| 4,589,068 A | 5/1986 | Heinen, Jr. | |
| 4,979,074 A | 12/1990 | Morley et al. | |
| 5,228,039 A | 7/1993 | Knoke et al. | |
| 5,388,252 A | 2/1995 | Dreste et al. | |
| 5,455,933 A | 10/1995 | Schieve et al. | |
| 5,491,743 A | 2/1996 | Shiio et al. | |
| 5,615,331 A | 3/1997 | Toorians et al. | |
| 5,625,410 A | 4/1997 | Washino et al. | |
| 5,630,049 A | 5/1997 | Cardoza et al. | |
| 5,732,212 A | 3/1998 | Perholtz et al. | |
| 5,777,874 A | 7/1998 | Flood et al. | |
| 5,815,653 A | 9/1998 | You et al. | |
| 5,819,093 A | 10/1998 | Davidson et al. | |
| 5,850,562 A | 12/1998 | Crump et al. | |
| 5,878,158 A | 3/1999 | Ferris et al. | |
| 5,953,451 A | 9/1999 | Syeda-Mahmood | |
| 5,990,852 A | 11/1999 | Szamrej | |
| 5,991,546 A * | 11/1999 | Chan et al. ..................... | 710/62 |

(Continued)

OTHER PUBLICATIONS

Quick Specs: Compaq PCI Card KVM Switches, Version 5, Mar. 13, 2003 5 pages.

(Continued)

*Primary Examiner* — Ranodhi Serrao
*Assistant Examiner* — Muktesh G Gupta
(74) *Attorney, Agent, or Firm* — Morris Manning & Martin, LLP; Tim Tingkang Xia, Esq.

(57) ABSTRACT

Methods, systems, and apparatus are provided for enabling communication with a computer management device. According to a method one or more vendor specific commands for communicating with a management device are defined according to a first communication standard. The one or more vendor specific commands are then transmitted to the management device over a communication link conforming to a second communication standard. A device conforming to the second communication standard may be emulated on the communication link. If vendor specific commands are received by the management device that are not intended for the emulated device, the commands may be used for communicating with the management device.

10 Claims, 5 Drawing Sheets

U.S. PATENT DOCUMENTS

| | | | |
|---|---|---|---|
| 6,011,920 A | 1/2000 | Edwards et al. | |
| 6,035,059 A | 3/2000 | Kurosawa et al. | |
| 6,054,676 A | 4/2000 | Wall et al. | |
| 6,055,334 A | 4/2000 | Kato | |
| 6,065,072 A | 5/2000 | Flath | |
| 6,115,645 A | 9/2000 | Berar | |
| 6,119,247 A | 9/2000 | House et al. | |
| 6,124,811 A | 9/2000 | Acharya et al. | |
| 6,137,455 A | 10/2000 | Duo | |
| 6,145,088 A | 11/2000 | Stevens | |
| 6,170,021 B1 | 1/2001 | Graf | |
| 6,202,070 B1 | 3/2001 | Nguyen et al. | |
| 6,209,023 B1 | 3/2001 | Dimitroff et al. | |
| 6,219,695 B1 | 4/2001 | Guttag et al. | |
| 6,236,884 B1 | 5/2001 | Hunter et al. | |
| 6,243,743 B1 | 6/2001 | Freeny | |
| 6,263,373 B1 | 7/2001 | Cromer et al. | |
| 6,272,562 B1 | 8/2001 | Scott et al. | |
| 6,304,895 B1 | 10/2001 | Schneider et al. | |
| 6,330,167 B1 | 12/2001 | Kobayashi | |
| 6,360,250 B1 | 3/2002 | Anupam et al. | |
| 6,377,461 B1 | 4/2002 | Ozmat et al. | |
| 6,378,014 B1 | 4/2002 | Shirley | |
| 6,389,464 B1 * | 5/2002 | Krishnamurthy et al. | 709/220 |
| 6,397,256 B1 | 5/2002 | Chan et al. | |
| 6,414,716 B1 | 7/2002 | Kawai | |
| 6,434,003 B1 | 8/2002 | Roy et al. | |
| 6,476,854 B1 | 11/2002 | Emerson et al. | |
| 6,480,901 B1 * | 11/2002 | Weber et al. | 709/246 |
| 6,552,914 B1 | 4/2003 | Chang | |
| 6,560,641 B1 | 5/2003 | Powderly et al. | |
| 6,594,698 B1 * | 7/2003 | Chow et al. | 709/226 |
| 6,601,119 B1 | 7/2003 | Slutz et al. | |
| 6,603,665 B1 | 8/2003 | Truong et al. | |
| 6,609,034 B1 | 8/2003 | Behrens et al. | |
| 6,636,929 B1 * | 10/2003 | Hascall et al. | 710/313 |
| 6,636,982 B1 | 10/2003 | Rowlands | |
| 6,651,120 B2 | 11/2003 | Chiba et al. | |
| 6,651,190 B1 | 11/2003 | Worley et al. | |
| 6,662,217 B1 | 12/2003 | Godfrey et al. | |
| 6,664,969 B1 | 12/2003 | Emerson et al. | |
| 6,681,250 B1 | 1/2004 | Thomas et al. | |
| 6,754,891 B1 | 6/2004 | Snyder et al. | |
| 6,816,917 B2 * | 11/2004 | Dicorpo et al. | 710/5 |
| 6,816,963 B1 | 11/2004 | Krithivas et al. | |
| 6,820,267 B2 | 11/2004 | Christensen et al. | |
| 6,823,401 B2 * | 11/2004 | Feather et al. | 710/18 |
| 6,825,846 B2 | 11/2004 | Mondal | |
| 6,857,005 B2 | 2/2005 | Kistler et al. | |
| 6,859,882 B2 * | 2/2005 | Fung | 713/300 |
| 6,907,519 B2 | 6/2005 | Desoli | |
| 6,952,743 B2 | 10/2005 | Ortega, III et al. | |
| 6,959,380 B2 | 10/2005 | Dake et al. | |
| 6,963,425 B1 | 11/2005 | Nair et al. | |
| 6,993,747 B1 | 1/2006 | Friedman | |
| 7,003,563 B2 | 2/2006 | Leigh et al. | |
| 7,039,229 B2 | 5/2006 | Lin et al. | |
| 7,076,400 B2 * | 7/2006 | Dulberg et al. | 702/184 |
| 7,149,796 B2 * | 12/2006 | McDaniel-Sanders et al. | 709/223 |
| 7,165,041 B1 | 1/2007 | Guheen et al. | |
| 7,181,510 B2 | 2/2007 | Emerson et al. | |
| 7,206,875 B2 | 4/2007 | Marushak et al. | |
| 7,209,874 B2 | 4/2007 | Salmonsen | |
| 7,231,606 B2 | 6/2007 | Miller et al. | |
| 7,260,624 B2 | 8/2007 | Sivertsen | |
| 7,289,334 B2 | 10/2007 | Behrens et al. | |
| 7,299,463 B2 | 11/2007 | Brannock et al. | |
| 7,496,492 B2 * | 2/2009 | Dai | 703/24 |
| 7,640,325 B1 * | 12/2009 | DeKoning et al. | 709/223 |
| 7,657,665 B2 * | 2/2010 | Dalton et al. | 710/5 |
| 7,702,763 B2 * | 4/2010 | Slater et al. | 709/223 |
| 7,966,391 B2 * | 6/2011 | Anderson et al. | 709/223 |
| 8,069,257 B1 * | 11/2011 | Bhatia et al. | 709/230 |
| 2001/0027465 A1 | 10/2001 | Hammelbacher | |
| 2001/0037366 A1 | 11/2001 | Webb et al. | |
| 2002/0040418 A1 | 4/2002 | Bress et al. | |
| 2002/0078188 A1 | 6/2002 | Anand et al. | |
| 2002/0083156 A1 | 6/2002 | Wysoczynski | |
| 2002/0087949 A1 | 7/2002 | Golender et al. | |
| 2002/0097234 A1 | 7/2002 | Sauber | |
| 2002/0103882 A1 | 8/2002 | Johnston et al. | |
| 2002/0124128 A1 | 9/2002 | Qiu | |
| 2002/0174415 A1 | 11/2002 | Hines | |
| 2002/0178320 A1 | 11/2002 | Wu | |
| 2002/0194403 A1 | 12/2002 | Pua et al. | |
| 2002/0199035 A1 | 12/2002 | Christensen et al. | |
| 2003/0023435 A1 | 1/2003 | Josephson | |
| 2003/0035049 A1 | 2/2003 | Dickens et al. | |
| 2003/0058248 A1 | 3/2003 | Hochmuth et al. | |
| 2003/0083842 A1 | 5/2003 | Miller et al. | |
| 2003/0110244 A1 | 6/2003 | Mondal | |
| 2003/0135674 A1 * | 7/2003 | Mason et al. | 710/74 |
| 2003/0156132 A1 | 8/2003 | Gn et al. | |
| 2003/0177111 A1 | 9/2003 | Egendorf et al. | |
| 2003/0200273 A1 | 10/2003 | Khanna et al. | |
| 2003/0226015 A1 | 12/2003 | Neufeld et al. | |
| 2004/0054838 A1 | 3/2004 | Hoese et al. | |
| 2004/0059782 A1 | 3/2004 | Sivertsen | |
| 2004/0139240 A1 | 7/2004 | DiCorpo et al. | |
| 2004/0158614 A1 | 8/2004 | Williams | |
| 2004/0190773 A1 | 9/2004 | Messer et al. | |
| 2004/0199699 A1 | 10/2004 | Bobbitt et al. | |
| 2004/0215617 A1 | 10/2004 | Ramsey et al. | |
| 2004/0255276 A1 | 12/2004 | Rovang | |
| 2005/0021654 A1 | 1/2005 | Kern et al. | |
| 2005/0021870 A1 * | 1/2005 | Carnahan et al. | 709/249 |
| 2005/0044244 A1 | 2/2005 | Warwick et al. | |
| 2005/0066000 A1 | 3/2005 | Liaw et al. | |
| 2005/0086670 A1 | 4/2005 | Christensen et al. | |
| 2005/0138346 A1 * | 6/2005 | Cauthron | 713/2 |
| 2006/0189900 A1 | 8/2006 | Flaherty | |
| 2006/0195042 A1 | 8/2006 | Flaherty | |
| 2007/0168746 A1 | 7/2007 | Righi et al. | |

OTHER PUBLICATIONS

Saelig Online Store, UCA93LV, printed from www.saelig.com on Aug. 29, 2005, 2 pages.

Calibre, "UCA93LV: USB—I2C Communications Adapter for PCs" Jan. 28, 2005, 2 pages.

AVIT Research, Ltyd., I2C Bus Tool, printed from www.avitresearch.co.uk/ on Aug. 29, 2005, 4 pages.

American Megatrends, Inc., AMI Debug Source Level Modular Software Debugger, Data Sheet, Dec. 14, 2004, 2 pages.

American Megatrends, Inc., AMIBIOS8, Introduction to AMIBIOS8TM: Overview of Key Features in the Latest AMIBIOS®, Version 1.20, Mar. 25, 2002, 22 pages.

American Megatrends AMIDiag for Windows User's Guide (Version 2.0), Feb. 25, 2002. http://ami.com.support/docc/MAN-DIAG-WIN.pdf.

"Cable Allows Users to Extend DVI Connections," Jul. 31, 2001, The Mac Observer, printed from http://www.macobservercom/article/2001/07/31.11.shtml, 4 pages.

American Megatrends, Inc., AMIdebug User's Guide (Version 2.0), 2002.

Raritan Computer, Inc., "Raritan Announces New Paragon CIMs with Innovative DirectConnect Technology," a press release, Jan. 14, 2002, printed from www.raritan.com on Jan. 27, 2005.

"New KVM Switching System Controls 2, 048 Servers Using Cat5 Cable" printout from Raritan website found at http://www.raritan.com//about/abt_press_detail.aspx?&status=4&articleld=127, printed May 24, 2006.

"Z Series Information Page" printout from Raritan website found at www.Raritan.com/products/kvm_switches/z_series/prd_line.aspx. Printed Feb. 10, 2006.

* cited by examiner

METHOD, SYSTEM, AND APPARATUS FOR COMMUNICATING WITH A COMPUTER MANAGEMENT DEVICE

This application is a continuation of, and claims benefit of U.S. patent application Ser. No. 10/790,160, filed Mar. 1, 2004 now U.S. Pat. No. 7,827,258, entitled "METHOD, SYSTEM, AND APPARATUS FOR COMMUNICATING WITH A COMPUTER MANAGEMENT DEVICE" by Subash Kalbarga, which status is allowed, the disclosure of which is incorporated herein by reference in its entirety.

BACKGROUND OF THE INVENTION

Computers are often linked together through networks to allow the resources of a computer at one location to be utilized by users located at a different location. In a distributed environment such as this, computers known as servers perform various tasks for client computers that communicate with the servers over a network. Servers enable sharing of files and other resources between client computers and the server. As an example, a world wide web ("web") server may provide documents and other resources to client computers over the Internet.

It is often necessary to manage the operation of a server computer. For instance, it may be desirable to determine the relative health of a server computer by viewing screen display information and by interacting with the server through user input devices. This is especially true for server computers that maintain resources that are utilized by a large number of client computers, such as within a corporate network or the Internet. For many conventional systems, the technician that needs to view the screen displays and interact with the server being managed is required to be physically located at the site of the server. However, it is not always feasible for a technician to be physically present at the location of the server computer.

For example, a system administrator of a corporate network may be present at one location while the servers of the corporate network may be spread around the country or even the globe. To effectively manage the servers on the corporate network, the system administrator must be able to monitor and control each of the server computers, regardless of their location. Because the system administrator cannot be physically present at each server to be managed, effective management of the server computers becomes very difficult if not impossible. As a result, it can be very costly to maintain servers located in disparate physical locations.

Some systems for remotely administering server computers utilize a server computer management device connected to each server computer. Each management device connects to a video output of a server computer and is operative to compress and transmit the video output of the server computer to a remote computer via a network connection. User input received at the remote computer is transmitted to the management device and is provided by the management device to the server computer as if the input was made locally to the server computer. In this manner, the management device can receive user input commands provided at the remote computer and provide the input commands to the server computer as if the input commands were physically generated by a user at the server computer. A user of the remote computer can control the operation of the server computer from a remote location and perform administration tasks as necessary.

Because many server computers are "headless" and do not have a directly attached display or input devices, installing and configuring a management device has previously been very difficult. In particular, some management devices implement custom communication hardware for communicating with the server computer. Because custom hardware is utilized by the management device, a hardware driver must be provided for each operating system with which the management device will be utilized. The hardware driver must then be installed each time a management device is attached to a server computer. Because server computers are typically headless, it can be very difficult to ensure that a driver has been successfully installed for communicating with the management device.

Another problem with previous management devices relates to the redirection of the video output of the server computer to a remote computer. In particular, when a user of the remote computer connected to the management device moves a mouse cursor at the remote computer or other type of input pointer, there can be a long delay before the movement is reflected in the redirected video output of the server computer that is displayed at the remote computer. This can be very frustrating and confusing for a user. Accordingly, there is a need for an improved management device that may be installed and utilized without the need for a custom hardware driver and that can improve the speed of a user input cursor on a remote computer when redirecting video from the server computer. It is with respect to these considerations and others that the present invention has been made.

SUMMARY OF THE INVENTION

In accordance with the present invention, the above and other problems are solved by an improved management device for connection to a host computer that does not require a custom hardware driver. Moreover, according to the methods, systems, and apparatus provided herein, the speed of a user input cursor on a remote computer can be greatly increased when the management device is utilized to redirect the video output of the host computer to a remote computer.

According to one aspect of the invention, an improved management device for managing the activities of a host computer is provided. The management device is operative to receive the video output of the host computer and to transmit the video output over a network to a remote computer. The management device is also operative to receive user input, such as keyboard commands or mouse movements and selections, from the remote computer and to provide the user input to the host computer. Through the use of such a management device, a remotely located user of the remote computer can view the video output of the host computer and control the operation of the host computer. To accomplish these tasks, the management device receives the video output of the host computer and provides input to the mouse and keyboard connectors of the host computer.

The management device provided herein is also operative to communicate with a host computer over a standard communication link, such as a Universal Serial Bus ("USB") connection. To enable communication between the host computer and the management device, the management device emulates a standard device on the communication link. For instance, according to one embodiment, the management device is operative to emulate a standard mass storage device, such as a CD-ROM device, on the communication link. Because the device is a standard device, the operating system of the host computer can utilize a standard operating system vendor-provided driver to communicate with the emulated device. No custom hardware driver is necessary to communicate with the device emulated by the management device on the communication link.

According to one embodiment of the invention, the emulated mass storage device can be utilized to redirect the contents of a mass storage device connected to the remote computer to the host computer. Through the use of program code executing on the management device and the remote computer, the contents of a mass storage device physically connected to the remote computer, such as a CD-ROM device, can be made available to the host computer. In particular, program code executing on the management device exposes the contents of the mass storage device of the remote computer to the host computer through the emulated mass storage device on the communication link. All read and write requests from the host computer are intercepted by the management device and relayed over the network to the remote computer. From the perspective of the host computer, the emulated device appears no different than a physical device actually connected to the host computer.

According to another embodiment of the invention, the emulated device provided by the management device on the communications link can be utilized for out-of-band communication between the host computer and the management device. Out-of-band communication may be useful, for instance, for configuring aspects of the operation of the management device from the host computer. In order to provide out-of-band communication without requiring a custom hardware driver, the host computer issues vendor specific commands that conform to a second communication standard to the managed device over the communication link. For instance, according to one embodiment of the invention, the host computer issues small computer system interface ("SCSI") commands over a USB connection to the emulated mass storage device in order to perform out-of-band communication with the management device.

When the management device receives commands destined for the emulate device, firmware executing on the management device determines whether the commands are actually intended for the emulated device, such as a read or write command, or whether the commands are vendor specific commands intended for out-of-band communication with the management device. If the commands are actually intended for communication with the emulated device, these commands are processed in a manner that allows the host computer to communicate with the emulated device. If the commands are intended for communicating with the management device itself, the commands are intercepted and utilized by the management device for the requested purpose. The management device may also perform return communication with the host computer utilizing vendor specific commands.

According to one aspect of the invention, out-of-band communication between the host computer and the management device is utilized to configure aspects of the management device. In particular, according to this embodiment of the invention, an application executing on the host computer is operative to transmit vendor specific commands to the emulated device over the communications link for configuring the management device. The management device is operative to receive the commands, to determine that the commands are not actually intended for the emulated device, and to utilize the commands to configure itself. For instance, commands may be issued to configure a network address or other device-specific feature of the management device.

According to another aspect of the invention, out-of-band communication between the host computer and the management device may be utilized to increase the speed of a user input cursor, such as a mouse cursor, shown on the redirected display of the remote computer. In particular, according to this embodiment of the invention, the management device is operative to continually receive data from the remote computer indicating the current position of a user input cursor on the remote computer. An application executing on the host computer is operative to periodically transmit vendor specific commands to the emulated device requesting the current position of the user input cursor on the remote computer. The management device receives the vendor specific commands, determines that the commands are not actually intended for the emulated device, and, in response to the commands, returns the current position of the user input cursor of the remote computer to the host computer. The application executing on the host computer then sets the location of the user input cursor on the host computer to the same position as the received current position. In this mariner, the position of the user input cursor on the host computer more closely follows the position of the user input cursor on the remote computer and increases the speed of the cursor on the remote computer.

According to various aspects of the invention, a method, a computer-controlled apparatus, and a computer-readable medium having instructions capable of performing the various embodiments described herein are also provided. These and various other features as well as advantages, which characterize the present invention, will be apparent from a reading of the following detailed description and a review of the associated drawings.

DETAILED DESCRIPTION OF THE INVENTION

As described briefly above, embodiments of the present invention provide methods, apparatus, and computer-readable media for communicating with a server management device. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
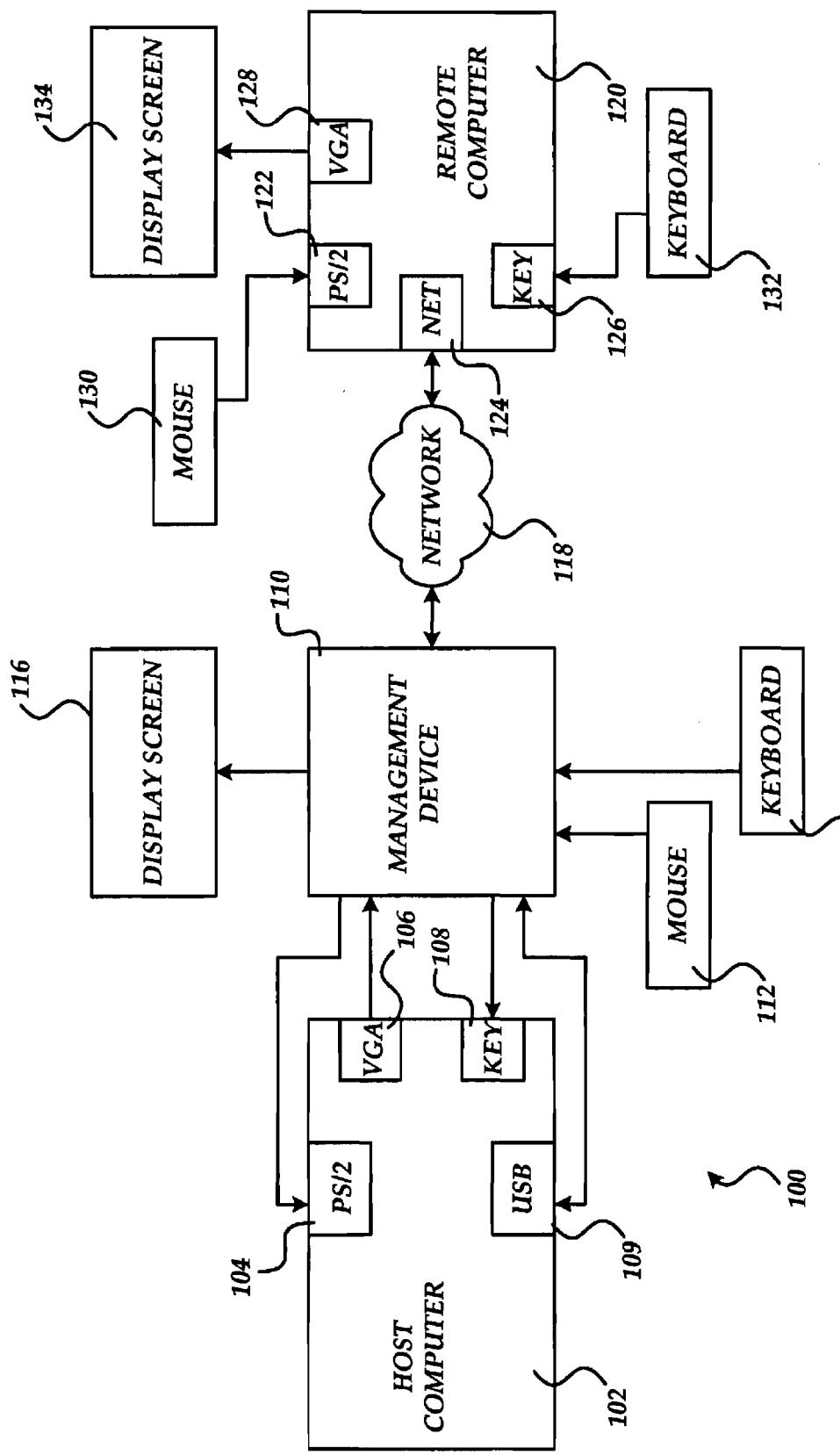
FIG. 1 is a network diagram illustrating an operating environment for the present invention that allows a remote computer to display screen frames of a host computer and provide user management with the host computer.

Referring now to the drawings, in which like numerals represent like elements throughout the several figures, aspects of the present invention and the illustrative operating environment will be described. FIG. 1 and the following discussion are intended to provide a brief, general description of a suitable computing environment in which the invention may be implemented. While the invention will be described in the general context of enabling communication between a host computer and a management device, those skilled in the art will recognize that the invention may also be implemented in combination with other computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules or data files may be located in both local and remote memory storage devices.

Turning now to FIG. 1, a general operating environment for embodiments of the present invention will be described. As shown in FIG. 1, a system 100 is provided according to the various embodiments of the invention. The system 100 includes a host computer 102 that is to be remotely managed. A management device 110 (also referred to alternately as a "redirection device", an "interaction device", or "management hardware") is interposed between a network 118 and the host computer 102. A remote computer 120 is linked to the network 118, and the host computer 102 may or may not be linked to the same network 118 or another network not shown. The network 118 may be of various forms such as a local area network ("LAN") or wide area network ("WAN") including the Internet. A user is located at the remote computer 120 and remotely manages the host computer 102 via the network 118 and management device 110.

The management device 110 may be linked to the host computer 102 through several input/output ("I/O") connections of the host computer 102. Generally, a host computer 102 will have a video display output 106, such as an analog or digital VGA output. Also, the host computer 102 typically includes a PS/2 port or ordinary serial port configured as a mouse port 104, a keyboard port 108, and may also include a universal serial bus ("USB") port 109.

The video display output 106 provides a signal that ordinarily is passed directly to a display screen or monitor 116 where screen frames are displayed for a user present at the host computer 102. However, in the embodiment shown, the video display output 106 provides a video signal to a video input of the management device 110. The management device 110 then passes the video signal through a video output to the display screen 116 where a normal video display of screen frames occurs. Additional details regarding the operation of the management device 110 and its operations upon the video signal are described in U.S. patent application Ser. No. 10/247,876, entitled "Systems and Methods for Establishing Interaction Between A Local computer and a Remote Computer", which is assigned to the assignee of the instant patent application and expressly incorporated herein by reference.

User input devices may also be provided for the host computer 102, including a local mouse 112 and local keyboard 114. Conventionally, the local mouse 112 and local keyboard 114 would be directly connected to the mouse port 104 and keyboard port 108 of the host computer 102. However, for the embodiment shown, the local mouse 112 and local keyboard 114 are connected to a mouse port and keyboard port, respectively, of the management device 110 and provide mouse and keyboard data to the management device 110 through these connections. The management device 110 then passes the mouse data and keyboard data to the respective ports of the host computer 102.

In addition to providing the pass-through of the video signal to the display screen 116, the management device 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the management device 110 and the remote computer 120, such as the TCP/IP protocol ordinarily used via the Internet.

The remote computer 120 implements an application, such as a dedicated application or plug-in executing within a general purpose browser window such as a web browser, for receiving the screen frame data through the network interface 124 and providing a display on the display screen 134. The display includes the screen frame produced by the host computer 102 that corresponds to the screen frame data transferred by the management device 110. Typically, the remote computer 120 includes a video adapter that has a video output 128 connected to the display screen 134 to provide the video signals.

To allow the user of the remote computer 120 to fully interact with the host computer 102, user interface devices such as a mouse 130 and keyboard 132 are connected to a mouse port 122 and keyboard port 126, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the management device, then the processing device of the remote computer 120 transfers the user activity data over the network 118 to the management device 110 that passes it to the mouse port 104 and/or keyboard port 108.

Once the host computer 102 receives the user activity data through the mouse port 104 and/or keyboard port 108, the host computer 102 then implements the user activity as if it had occurred directly through the local mouse 112 or local keyboard 114. When implemented, the user activity alters the screen frame to be displayed. Therefore, the video signal output by the video connector 106 to the management device 110 provides the screen frames that show the change caused by the user activity at the remote computer 120, such as the mouse pointer moving or typed letters appearing in an electronic document.

The management device 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the host computer 102 and transferring the updated screen frame back to the remote computer 120.

As processing and propagation delays decrease within the environment 100, the initial and subsequent display of the same user activity (i.e., multiple cursors or mouse pointers) on the display screen 134 converge in time so that the user sees only one change. For example, moving a mouse pointer within the host computer screen frame shown on the display screen 134 may appear immediately as the user performs the activity and then later reappear such as a ghost movement once the screen frame update is received. However, as delays are reduced, for example by Giga-bit per second network transfer rates, or through methods described herein, the initial and subsequent mouse pointer movements converge to one movement as perceived by the user of the remote computer 120. Furthermore, as discussed below, the host computer 102 may continually determine the location of the mouse pointer, or cursor, on the remote computer 120 and set the location of the mouse cursor on the host computer 102 to the same location. This also increases the perceived speed of the mouse cursor on the remote computer 120.

In addition to receiving user input, the management device 110 may also provide for additional management with the remote computer 120 by providing a USB connection to a USB port 109 of the host computer 102. The USB connection allows the management device 110 to emulate USB devices for the host computer 102, such as additional mass storage devices including devices that the host computer 102 may use when booting-up. For example, the remote computer 120 may provide a floppy, CD-ROM, or hard disk drive that contains a boot-up sequence to be used by the host computer 102. Upon a connection being established over the network 118 between the management device 110 and remote computer 120, the host computer 102 may boot from a media source of the remote computer 120 with the boot-up sequence provided through the USB port 109.

The USB connection from the management device 110 may also allow a local keyboard and mouse and/or a keyboard and mouse of the remote computer to be emulated for the host computer 102. For example, the host computer 102 may have only USB ports instead of PS/2 ports and the management device 110 outputs mouse and keyboard signals to the host computer through the USB connection.

To establish the USB connectivity discussed above between the management device 110 and the host computer 102, a USB microcontroller may be included as a part of the management device 110. The USB microcontroller communicates with the processing device 220 to emulate a USB node for the host computer 102. Thus, a media source of the remote computer may be accessible by the host computer 102 by the USB microcontroller 234 emulating a USB media device for the host computer 102.

It should be appreciated that the redirection device may comprise a device located internal to the host computer 102 or an external device connected to the external connections of the host computer 110 as shown in FIG. 1. Such a device is described in U.S. patent application Ser. No. 10/247,876, entitled "Systems and Methods for Establishing Interaction Between A Local computer and a Remote Computer", which is assigned to the assignee of the instant patent application and expressly incorporated herein by reference. Another embodiment may comprise a management device 110 that is integrated with the main system board of the host computer 102 or contained on an adapter card located within the host computer 110. Such a device is described in U.S. patent application Ser. No. 10/016,484, entitled "Systems and Methods for Capturing Screen Displays From A Host Computing System for Display At A Remote Terminal", which is also assigned to the assignee of the instant patent application and expressly incorporated herein. It should be appreciated that the physical and logical connections between the various components are essentially the same regardless of whether the management device 110 is located internal to or external from the host computer 102. It should also be appreciated that other configurations may be utilized without departing from the spirit and scope of the invention.

Figure 2:
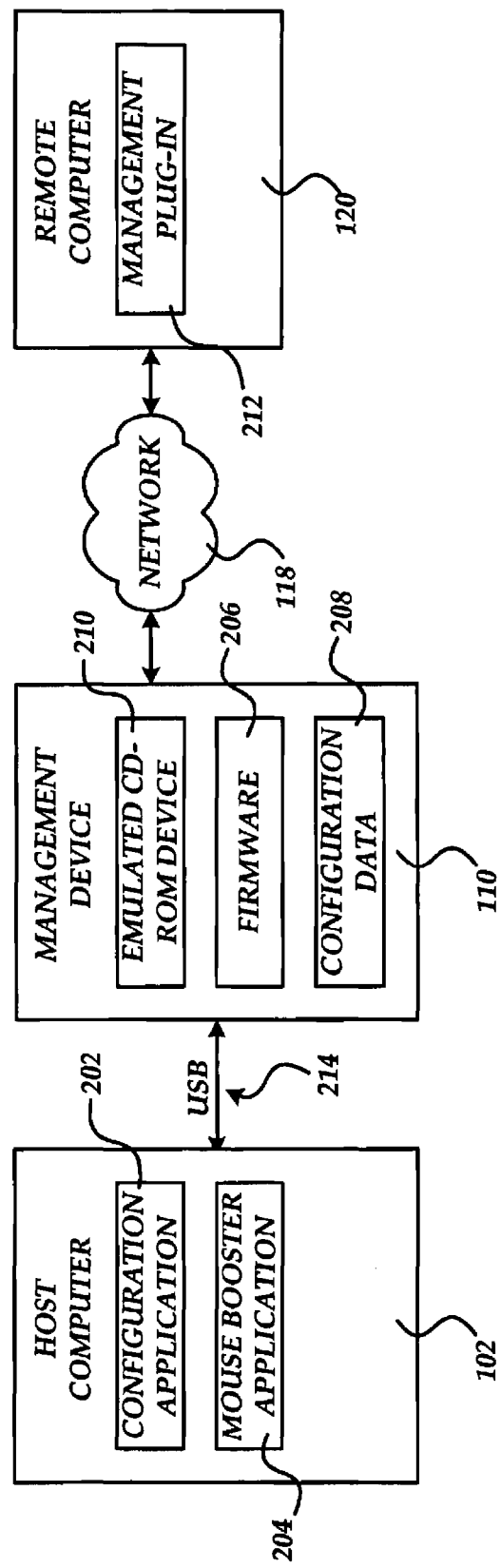
FIG. 2 is a block diagram illustrating aspects of a host computer and management device provided according to the various embodiments of the invention.

Referring now to FIG. 2, additional details regarding the operation of the host computer 102, the management device 110, and the remote computer 120 will be described. As described briefly above, the host computer 102 and the remote computer 120 may comprise standard desktop or server computers. The host computer 102 and the remote computer 120 may include many of the convention components of such computer systems, including a central processing unit ("CPU"), a volatile memory, a mass storage device, a display device, input devices such as a mouse and keyboard, and other conventional peripherals (not shown in FIG. 2). The mass storage devices within the host computer 102 and the remote computer 120 and their associated computer-readable media, provide non-volatile storage for the host computer 102 and the remote computer 120, respectively. Although the description of computer-readable media contained herein refers to a mass storage device, such as a hard disk or CD-ROM drive, it should be appreciated by those skilled in the art that computer-readable media can be any available media that can be accessed by the host computer 102 and the remote computer 120.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the host computer 102 and the remote computer 120.

A number of program modules and data files may be stored in the mass storage devices and memory of the host computer 102 and the remote computer 120, including an operating system suitable for controlling the operation of a networked personal or server computer, such as one of the family of WINDOWS operating systems or the MS-DOS operating system from MICROSOFT CORPORATION of Redmond, Wash. Other operating systems may also be utilized, such as the LINUX operating system.

According to various embodiments of the invention, the mass storage device of the remote computer 120 may also be operative to store a management plug-in 212. As described briefly above, the management plug-in 212 may comprise a stand-alone program or a plug-in operative to execute within a standard web browser. The management plug-in 212 is operative to decompress the video data transmitted by the management device 110 and to display the video output of the host computer 102 on the remote computer 120. The displayed output may include screen displays generated by the application programs, a basic input/output system ("BIOS"), or the operating system of the host computer 102.

According to various embodiments of the invention, the management plug-in 212 is also operative to receive user input commands, such as mouse cursor movements, mouse button selections, and keyboard commands, generated at the remote computer 120 by a user and to transmit the commands to the management device 110. The management device 110 then receives the user input commands from the plug-in 120 and provides the input commands to the host computer 102 as if the input commands were physically generated by a user at the host computer 102. In this manner, user input commands generated by a user physically located at the remote computer 120 may be passed through to the host computer 102.

The management device 110 comprises a special-purpose hardware device that includes a firmware program 206 stored in a non-volatile memory for performing the functionality described herein. The management device 110 also includes many of the conventional components of a special-purpose computer system. For instance, the management device 110 may include a CPU, a volatile and non-volatile memory, and an input/output controller for connection to the host computer 102 and the network 118 as described herein. For instance, the management device 110 may include a USB hub controller for connecting to the host computer 102 via the USB communication link 214. It should be appreciated that other types of communication links may be utilized for enabling communication between the host computer 102 and the management device 110, such as IEEE-1394, USB 2.0, and others.

The management device 110 is also operative to store configuration data 208. Configuration data 208 defines settings for the management device 110, such as network settings, including the network address for the management device, and other configuration details. The configuration data 208 is stored in a non-volatile memory of the management device 110. In order to modify the configuration data 208, a configuration application 202 may be utilized on the host computer 102. As will be described in greater detail below, the configuration application 202 issues commands to an application programming interface ("API") that communicates with the management device 110 utilizing SCSI commands issued over the USB connection.

As discussed above, the management device 110 may emulate a mass storage device, such as the emulated CD-ROM device 210, on the USB connection 214. The emulated CD-ROM device 210 may be utilized to redirect the contents of a mass storage device attached to the remote computer 212 to the host computer 102. The emulated CD-ROM device 120 may also be utilized for providing out-of-band communication between the host computer 102 and the management device 110. The emulated CD-ROM device 210 appears to the host computer 102 as a standard USB CD-ROM. Accordingly, the operating system executing on the host computer 102 utilizes a standard CD-ROM driver provided by the manufacturer of the operating system utilized on the host computer 102 for communicating with the CD-ROM device 210. No custom hardware drivers are necessary.

In order to modify the configuration data, the configuration application 202 issues commands to an API configured to issue vendor defined SCSI over USB commands to the emulated CD-ROM device 210. When these commands are received at the management device 110, the firmware 206 receives the commands and examines the commands to determine whether the commands are actually intended for the emulated CD-ROM device 210, such as read and write commands. If the commands are actually commands for configuring the management device 110, the firmware modifies the configuration data 208 as requested and issues a return call to the host computer also utilizing SCSI-over-USB commands. In this manner, the host computer 102 can communicate with the management device 110 without the use of a custom hardware driver.

Communication between the host computer 102 and the management device 110 in the manner described above may also be utilized to increase the speed of a user input cursor on the remote computer 120 when the video output of the host computer 102 is redirected. To accomplish this, the management plug-in 120 periodically transmits to the management device 110 the coordinates of the mouse cursor. In order to retrieve the coordinate information from the management device, the host computer 102 executes a "mouse booster" application 204. The mouse booster application 204 periodically transmits a request to the management device 110 for the current coordinates of the mouse cursor on the remote computer 120. This request is transmitted utilizing vendor defined SCSI commands over the USB communication link 214 in the manner described above. When these commands are received at the management device 110, the firmware 206 receives the commands and examines the commands to determine whether the commands are actually intended for the emulated CD-ROM device 210.

If the commands are actually commands requesting the current position of the mouse cursor on the remote computer 120, the firmware does not pass the commands to the emulated CD-ROM device 210, but rather responds to the commands with the current location of the coordinates of the mouse cursor on the remote computer 120. The mouse booster application 204 executing on the host computer 102 then sets the location of the mouse cursor on the host computer 102 to the same position as the coordinates of the mouse cursor on the remote computer 120. By continually modifying the position of the mouse cursor on the host computer 102 (for instance, every 50 ms) to reflect the current position of the mouse cursor on the remote computer 120, the effective speed of the mouse cursor on the remote computer 120 when interacting with video redirected from the host computer 102 is greatly increased.

Figure 3:
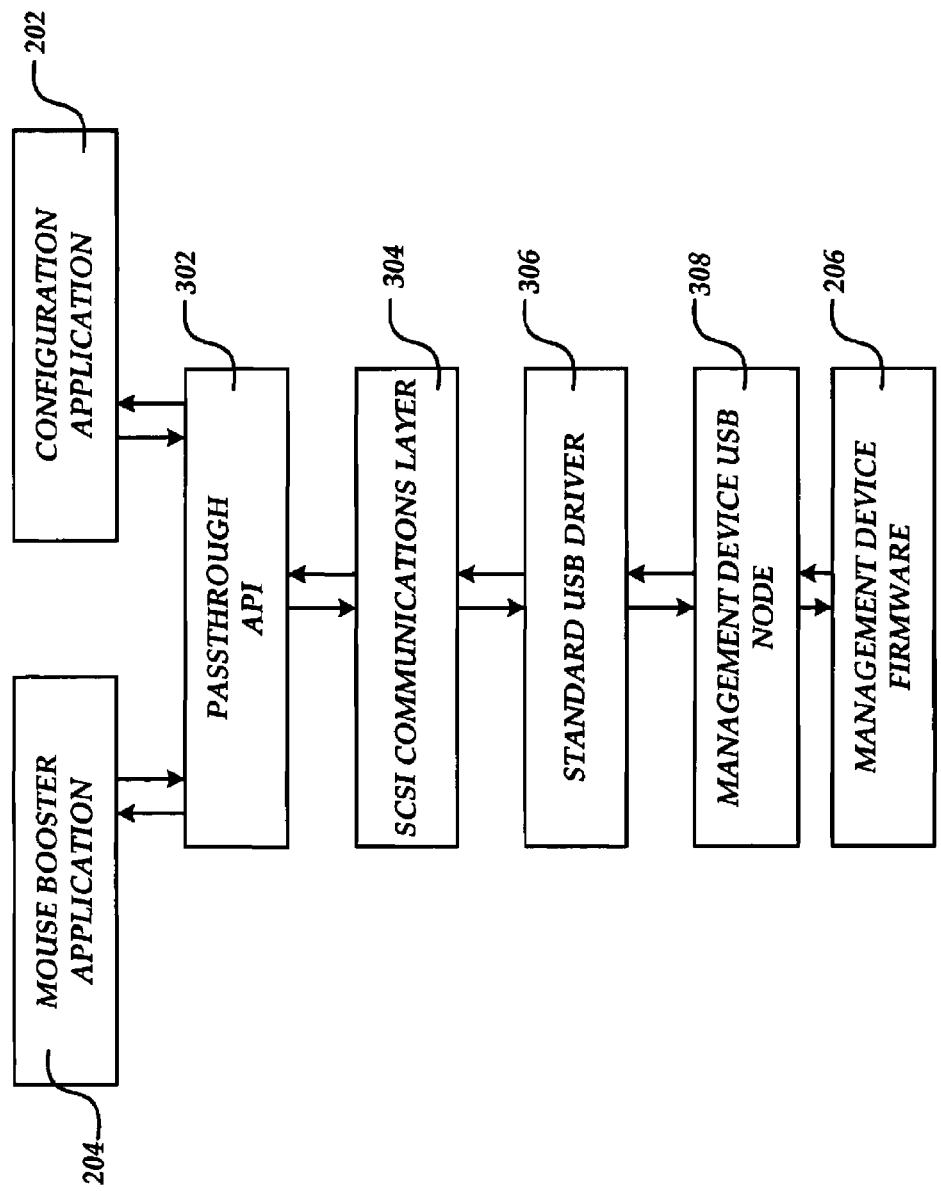
FIG. 3 is a block diagram showing a software architecture for a host computer utilized in the various embodiments of the invention.

Referring now to FIG. 3, aspects of a software architecture utilized on the host computer 102 for communicating with the management device 110 will be described. As shown in FIG. 3, the mouse booster application 204 and the configuration application 202 communicate with a passthrough API 302. The passthrough API 302 insulates the application programmer from having to understand the vendor specific SCSI over USB commands utilized for communicating with the management device 110. Rather, the passthrough API 302 provides a higher level set of routines that can be called from an application layer for communicating with the management device 110.

The passthrough API 302 issues commands to a SCSI communications layer 304 provided by the operating system of the host computer 102. As described above, these commands are vendor defined SCSI commands that are transmitted over a USB transport mechanism. Other types of transport mechanisms may also be utilized to transmit the SCSI commands. In turn, the SCSI communications layer 102 communicates with a standard USB driver 306 provided by the manufacturer of the operating system executing on the host computer 102. Because a standard driver is utilized, no additional drivers need to be installed on the host computer 102 to enable communication with the management device 110.

The USB driver 306 communicates with the management device USB node 308 over a USB cable. Commands received at the USB node 308 can be processed and utilized for configuring the management device 110 or for retrieving the coordinates of the mouse cursor on the remote computer 120. It should be appreciated that return commands from the management device 110 to the application executing on the host computer 102 may take the reverse path through the USB node 308, the USB driver 306, the SCSI layer 304, and the passthrough API 302.

Figure 4:
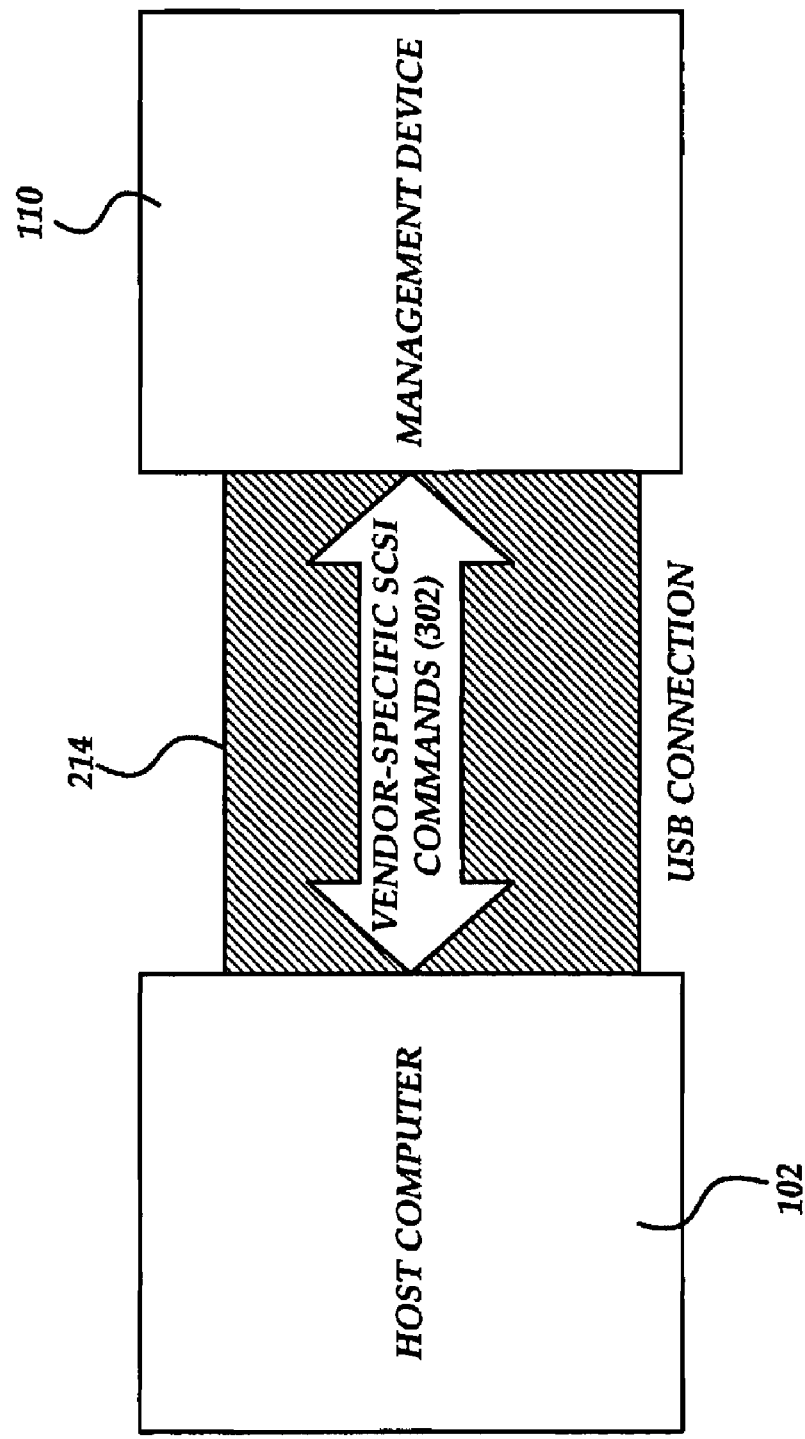
FIG. 4 is a block diagram showing aspects of a communication link between a host computer and a management device according to the different embodiments of the invention.

Referring now to FIG. 4, additional details regarding the connection between the host computer 102 and the management device 110 will be described. As discussed briefly above, a communication link is established between the host computer 102 and the management device 110 for transmitting out-of-band commands. According to the illustrative embodiment described herein, the communication link comprises a USB connection 214. However, it should be appreciated that the host computer 102 and the management device 110 may communicate over other types of communication links conforming to different standards. For instance, the host computer 102 and the management device 110 may be connected via a FIREWIRE connection or other type of high speed interface known to those skilled in the art.

As also briefly described above, in order to communicate with the emulated mass storage device on the USB connection 214, the host computer 102 issues vendor specific SCSI commands 302. As known to those skilled in the art, although the communication link between the host computer 102 and the management device 110 comprises a USB connection 214, commands may be defined by a vendor of the management device and transmitted over the USB connection 214 utilizing the SCSI protocol. When issued, these commands are typically ignored by the host computer 102 and passed directly through to the intended device on the USB connection 214. It should be appreciated however, that although SCSI-over-USB commands are utilized in the present invention, other types of commands conforming to other types of communication standards may also be issued over the communication link between the host computer 102 and the management device 110.

Figure 5:
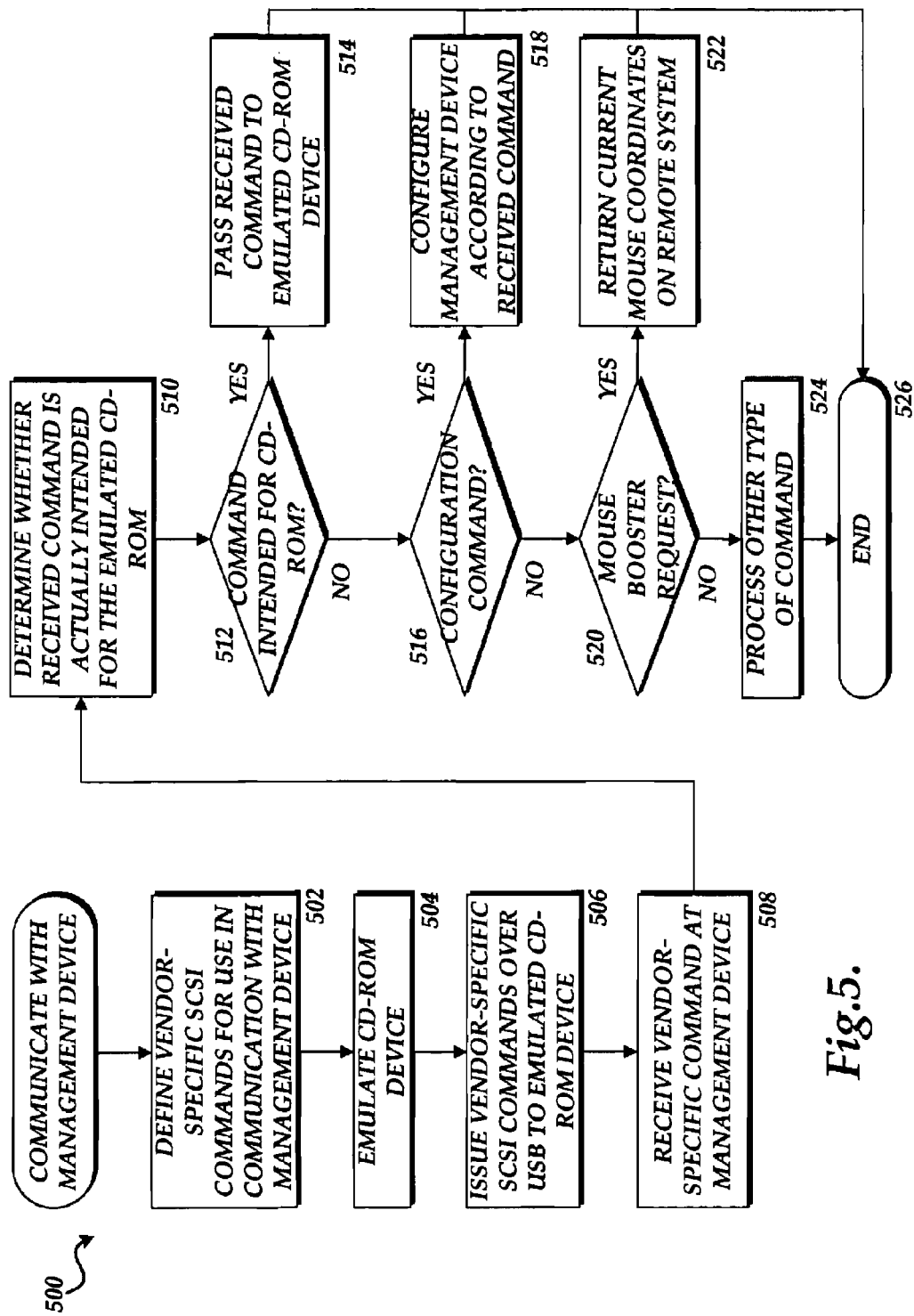
FIG. 5 is a flow diagram illustrating the functional aspects of the operation of a system for communicating with a management device according to the several embodiments of the invention.

Turning now to FIG. 5, a flow diagram will be described illustrating a method for enabling communication between the host computer and the management device. It should be appreciated that the logical operations of the various embodiments of the present invention, including those shown in FIG. 5, are implemented (1) as a sequence of computer implemented acts or program modules running on a computer system and or (2) as interconnected machine logic circuits or circuit modules within the computer system. The implementation is a matter of choice dependant upon the performance requirements of the computer system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 5, a routine 500 will be described that illustrates a method for enabling communication between a host computer 102 and a management device 110. The routine 500 begins at operation 502, where vendor specific commands are defined for use in communication with a management device 110. In particular, according to the embodiments described herein, commands are defined for reading and writing data at the management device 110, for setting configuration data 208 on the management device 110, and for retrieving the location of mouse coordinates on the remote computer 120. It should be appreciated that a vendor of the management device 110 may define other types of commands for performing other types of functions with respect to the management device 110.

From operation 502, the routine 500 continues to operation 504. At operation 504, the management device 110 is operative to emulate a mass storage device on the USB connection 302. In particular, according to the various embodiments described herein, the emulated device comprises a standard CD-ROM device. However, other types of devices may also be emulated and utilized provided that the host computer 102 is equipped with a standard driver for communicating with the emulated device. Once the management device 110 has emulated the CD-ROM device and made the device available to the host computer 102, the routine 500 continues from operation 504 to operation 506.

At operation 506, the host computer 102 issues vendor specific SCSI commands over the USB connection 302 to the emulated CD-ROM device. In particular, as described above, the commands may comprise commands for setting the configuration data 208 on the management device 110 or for retrieving the current location of a mouse pointer on the remote computer 120 from the management device 110. From operation 506, the routine 500 continues to operation 508.

At operation 508, the transmitted commands are received at the management device 110. The routine then continues to operation 510, where the management device 110 determines whether the received command is actually intended for the emulated device. In particular, the management device 110 determines whether the commands are read or write commands intended for accessing data on the emulated device or whether the commands are vendor specific commands for modifying the configuration data 208 or obtaining the location of the mouse pointer on the remote computer 120.

From operation 510, the routine 500 continues to operation 512, where the management device determines whether the received command is actually intended for the emulated CD-ROM device. If the command is intended for the CD-ROM device, the routine 500 branches to operation 512, where the received command is passed to the emulated CD-ROM device. In this manner, the host computer 102 can access the contents of the mass storage device redirected from the remote computer 102 to the management device 110 in the manner described above. From operation 514, the routine 500 continues to operation 526.

If, at operation 512, the management device 110 determines that the received command is not intended for the CD-ROM device, the routine 500 continues to operation 516. At operation 516, the management device 110 determines whether the received command comprises a vendor specific command for setting the configuration data 208. If the command is intended to set the configuration data 208, the routine 500 branches to operation 518 where the firmware program 206 sets the configuration data 208 in the manner described in the received commands. The routine 518 then continues to operation 526.

If, at operation 516, the management device 110 determines that the received command is not a command to configure the management device 110, the routine 500 continues to operation 520. At operation 520, the management device 110 determines whether the received command comprises a vendor specific command for receiving the coordinates of the mouse cursor on the remote computer 120. If the command is for retrieving the mouse cursor coordinates, the routine 500 branches to operation 522. At operation 522, the management device 100 returns the current position of the mouse cursor on the remote computer 120 to the house computer 102. The routine 500 then continues from operation 522 to operation 526.

If, at operation 520, the management device 110 determines that the received commands are not vendor specific commands for requesting the current position of the mouse cursor, the routine 500 continues to operation 524. At operation 524, other types of commands issued by the host computer 102 to the management device 110 may be processed. The routine 500 then continues from operation 524 to operation 526, where it ends.

Based on the foregoing, it should be appreciated that the various embodiments of the invention provide methods and systems for enabling communication with a computer management device. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for communicating with a computer management device, the method comprising:
    transmitting first and second commands to the management device over a communications link, wherein the first and second commands conform to a first communication standard, wherein the first command is a vendor specific command for modifying configuration data associated with the management device or for obtaining coordinates of a user input cursor on a remote computer system that is connected to a host computer via the management device, wherein the second command is a storage operation command, and wherein the communications link conforms to a second communication standard;
    emulating, at the management device, a device accessible through the communications link, wherein the emulated device conforms to the second communication standard;
    receiving, at the management device, the first and second commands through a same interface of the communications link;
    determining whether the first and second commands are emulated device commands for communicating with the emulated device; and
    in response to determining that the first command is not an emulated device command for communicating with the emulated device, utilizing the received first command for communicating with the management device and utilizing data contained in the received first command to configure the management device; and
    in response to determining that the second command is for communicating with the emulated device, passing the second command to the emulated device.

2. The method of claim 1, wherein configuring the management device comprises setting a network address of the management device based upon the contents of the received first command.

3. The method of claim 1, wherein the first communication standard comprises the SCSI standard, the second communication standard comprises the USB standard, and wherein the emulated device comprises a USB mass storage device.

4. A non-transitory computer-readable media having computer-executable instructions stored thereon which, when executed by a computer, cause the computer to perform the method of claim 1.

5. A computer-controlled apparatus configured for performing the method of claim 1.

6. A method for communicating with a computer management device, the method comprising:
    transmitting first and second commands to the management device over a communications link, wherein the first and second commands conform to a first communication standard, wherein the first command is a vendor specific command for modifying configuration data associated with the computer management device or for obtaining coordinates of a user input cursor on a remote computer system that is connected to a host computer via the management device, wherein the second command is a storage operation command, and wherein the communications link conforms to a second communication standard;
    emulating, at the management device, a device accessible through the communications link, wherein the emulated device conforms to the second communication standard;
    receiving, at the management device, the first and second commands through a same interface of the communications link;
    determining whether the first and second commands are emulated device commands for communicating with the emulated device;
    in response to determining that the first command is not an emulated device command for communicating with the emulated device:
        (i) utilizing the received first command for communicating with the management device;
        (ii) causing the management device to determine the coordinates of a user input cursor on a remote computer system that is connected to a host computer via the management device, wherein the first command comprises requests from the host computer to periodically receive the coordinates; and
        (iii) causing the management device to periodically transmit the coordinates to the host computer in response to the requests from the host computer; and
    in response to determining that the second command is for communicating with the emulated device, passing the second command to the emulated device.

7. The method of claim 1, wherein the second command is a storage read command or a storage write command.

8. The method of claim 1, wherein the first command instructs the management device to determine coordinates of a user input cursor on a remote computer system that is connected to a host computer via the management device.

9. The method of claim 6, wherein the second command is a storage read command or a storage write command.

10. The method of claim 6, wherein the first command instructs the management device to determine coordinates of a user input cursor on a remote computer system that is connected to a host computer via the management device.

* * * * *